(No Model.)
A. KRIEGER.
INSERTIBLE SAW TOOTH.
No. 248,761. Patented Oct. 25, 1881.
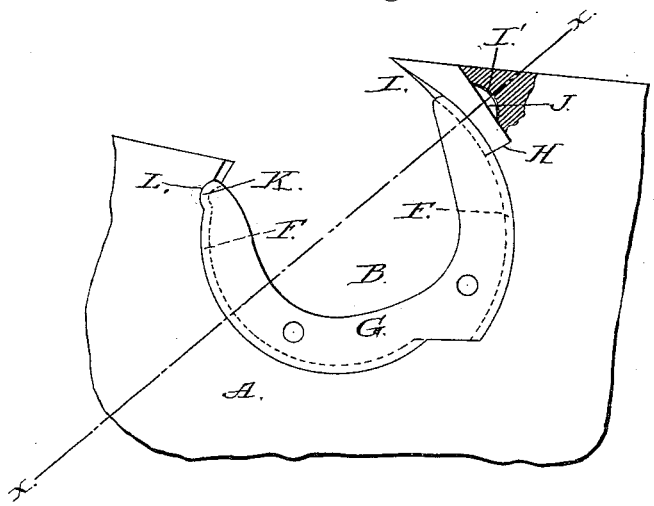
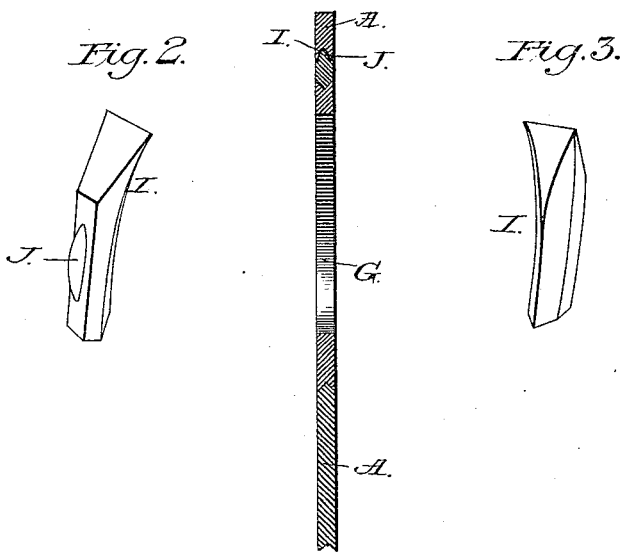
WITNESSES
John A. Evis.
Philp Ellasi
INVENTOR
Andrew Krieger
by Anderson & Smith
his ATTORNEYS

UNITED STATES PATENT OFFICE.

ANDREW KRIEGER, OF COLUMBUS, OHIO, ASSIGNOR TO JAMES OHLEN, OF SAME PLACE.

INSERTIBLE SAW-TOOTH.

SPECIFICATION forming part of Letters Patent No. 248,761, dated October 25, 1881.

Application filed August 23, 1881. (No model.)

*To all whom it may concern:*

Be it known that I, ANDREW KRIEGER, a citizen of the United States, resident at Columbus, in the county of Franklin and State of Ohio, have invented certain new and useful Improvements in Insertible Saw-Teeth; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1 is a representation of a side view of my saw-tooth, partly in section. Figs. 2 and 3 are perspective views of the tooth; and Fig. 4 is a vertical cross-section taken through $x\,x$ of Fig. 1.

This invention has relation to insertible saw-teeth; and it consists in the novel construction and arrangement of the saw-tooth provided with a projection on its back for engaging a depression in the recessed edge of the saw-plate, and a spring-clamp provided with an end projection for engaging a second recess and clamping the tooth firmly in place in the saw-plate, as will be hereinafter fully described, and particularly pointed out in the claims.

Heretofore I have made saws in accordance with the specification of Letters Patent No. 218,280, of August 5, 1879; but I find it difficult to make the teeth true enough in the groove to insure their being all in line with the saw-plate, owing to lateral deflection. It has also been very expensive to mill them on the back, and when forged in dies the sharp corners and edges forming the groove in the tooth will soon wear away, leaving the groove imperfect, which will cause the tooth to lean to one side or the other in the saw-plate. To avoid these objectionable features I have dispensed with the groove, and have made the back of the tooth at right angles to its sides, and have made an oblong rounded projection, nearly V-shaped in cross-section, in the center of the flat surface forming the back of the tooth, which projection J corresponds with and fits into a depression, I', in the inner edge of the saw-plate, as shown. The teeth are formed in steel dies having no sharp corners in them, and will last longer than teeth formed with such corners. They will also follow the line of the clamp more readily when being inserted than teeth provided with the groove at the back.

Referring by letter to the accompanying drawings, A designates a section of the saw-plate, having the socket B, provided with V-shaped tongues C and D.

G designates the clamping-plate, having groove F in its convex portions to receive the tongues C and D when the tooth is clamped in place. The outer end of the socket B has a recessed or shouldered portion, H, in which the shank of the saw-tooth I rests when held by the clamp. This recessed portion H is provided with a depression, I', into which a projection, J, on the flat surface of the back portion of the tooth I fits, and prevents lateral displacement of the tooth while in use. The inner end of the clamp G is provided with a slight projection, K, on its convex side, which snaps into a depression, L, in the inner edge of the saw-plate, as shown. The depression I' is formed with a milling-cutter, and allows the tooth to follow the clamping-plate, which can be bent to either side, thus insuring the alignment of the teeth with the saw-plate.

Having thus fully described my invention, what I claim as new, and desire to secure by Letters Patent, is—

1. The saw-plate A, having the socket B, provided with a shouldered portion, H, having a depression, I', in combination with the insertible saw-tooth I, adapted to such shouldered portion, and having the oblong rounded V-shaped projection J, as set forth.

2. The saw-plate A, having a socket, B, provided with the shouldered portion H, having the depression I, and also provided with the depression L, in combination with tooth I, having projection J, and the clamping-plate G, having projection K, as set forth.

In testimony whereof I affix my signature in presence of two witnesses.

ANDREW KRIEGER.

Witnesses:
   THEO. MUNGEN,
   JAMES J. SHUBY.